(12) United States Patent
Jacobsen et al.

(10) Patent No.: US 8,741,035 B2
(45) Date of Patent: Jun. 3, 2014

(54) SPRAY DRYER ABSORPTION PROCESS FOR FLUE GAS WITH ENTRAINED COARSE PARTICLES

(75) Inventors: Niels Jacobsen, Gentofte (DK); Henrik Maimann, Birkerød (DK); Bjarne Rasmussen, Copenhagen Ø (DK); Christian Holm Fridberg, Herley (DK)

(73) Assignee: GEA Process Engineering A/S, Soborg (DK)

( * ) Notice: Subject to any disclaimer, the term of this patent is extended or adjusted under 35 U.S.C. 154(b) by 632 days.

(21) Appl. No.: 13/054,395

(22) PCT Filed: Jul. 14, 2009

(86) PCT No.: PCT/DK2009/050177
§ 371 (c)(1),
(2), (4) Date: Feb. 17, 2011

(87) PCT Pub. No.: WO2010/006618
PCT Pub. Date: Jan. 21, 2010

(65) Prior Publication Data
US 2011/0139004 A1    Jun. 16, 2011

Related U.S. Application Data

(60) Provisional application No. 61/080,521, filed on Jul. 14, 2008.

(51) Int. Cl.
*B01D 47/06* (2006.01)

(52) U.S. Cl.
USPC ............... 96/301; 95/219; 96/321; 96/366

(58) Field of Classification Search
None
See application file for complete search history.

(56) References Cited

U.S. PATENT DOCUMENTS

| | | | | |
|---|---|---|---|---|
| 1,879,107 A * | 9/1932 | Couch | .......... | 96/253 |
| 2,432,757 A * | 12/1947 | Weniger | .......... | 96/376 |
| 2,750,170 A * | 6/1956 | Joyce | .......... | 261/50.1 |
| 3,307,334 A * | 3/1967 | Umbricht et al. | .......... | 96/265 |
| 3,375,058 A * | 3/1968 | Petersen et al. | .......... | 423/2 |
| 3,421,745 A * | 1/1969 | Prupis | .......... | 261/35 |
| 3,514,259 A * | 5/1970 | Ivan | .......... | 423/455 |
| 3,527,026 A * | 9/1970 | Mitsugi | .......... | 96/276 |
| 3,528,781 A * | 9/1970 | Turk Amos et al. | .......... | 422/169 |
| 3,850,593 A | 11/1974 | Beaujean et al. | | |
| 3,885,933 A * | 5/1975 | Putney | .......... | 55/397 |
| 3,923,481 A * | 12/1975 | Farrow | .......... | 55/398 |
| 4,028,076 A | 6/1977 | Fields | | |
| 4,140,500 A * | 2/1979 | Koponen | .......... | 96/200 |

(Continued)

*Primary Examiner* — Duane Smith
*Assistant Examiner* — Pankti Patel
(74) *Attorney, Agent, or Firm* — Ladas & Parry LLP (57) ABSTRACT

Disclosed herein is a method for reducing the amount of coarser particles from a stream of flue gas prior to treatment by a spray dryer absorption process (SDA). The method comprises the steps of directing a stream of flue gas containing entrained particles of varying sizes through a curve, thereby subjecting the particles to a centrifugal effect, collecting the particles predominately of the coarser size at a particles collecting means provided in the outer circumference of the curve, dispersing the flue gas reduced in particles of coarse particle sizes into the chamber of a spray dryer absorption apparatus, wherein the particles content of the original flue gas stream is above 20 g/Nm$^3$. Also an apparatus for performing the method and a gas disperser is disclosed. The method substantially reduces the cost of the entire plant for treating flue gas having a high content of entrained coarse particles by eliminating the need for a particle pre-collector upstream the SDA.

26 Claims, 6 Drawing Sheets

(56) References Cited

U.S. PATENT DOCUMENTS

| | | | |
|---|---|---|---|
| 4,519,990 A * | 5/1985 | Bevilaqua et al. | 423/210 |
| 4,571,311 A * | 2/1986 | Ferguson et al. | 261/64.3 |
| 4,619,404 A * | 10/1986 | Rasmussen | 239/461 |
| 5,024,684 A * | 6/1991 | Tank | 95/219 |
| 5,215,557 A * | 6/1993 | Johnson et al. | 96/52 |
| 5,227,018 A * | 7/1993 | Bro et al. | 159/4.02 |
| 5,562,743 A | 10/1996 | Daugherty et al. | |
| 5,667,543 A * | 9/1997 | Brouwers | 55/317 |
| 5,681,360 A | 10/1997 | Siwajek et al. | |
| 5,814,288 A | 9/1998 | Madden et al. | |
| 5,842,357 A | 12/1998 | Siwajek et al. | |
| 2005/0287056 A1 | 12/2005 | Baker et al. | |

* cited by examiner

SPRAY DRYER ABSORPTION PROCESS FOR FLUE GAS WITH ENTRAINED COARSE PARTICLES

RELATED APPLICATIONS

This application is a 371 of International Application PCT/DK2009/050177, filed Jul. 14, 2009, entitled "Spray Dryer Absorption Process for Flue Gas with Entrained Coarse Particles", which was published on Jan. 21, 2010, with International Publication Number WO 2010/006618, and which claims priority from U.S. Provisional Application 61/080,521, filed on Jul. 14, 2008, the contents of which are herein incorporated by reference.

INTRODUCTION

The present invention relates to a method for reducing the unwanted effect of coarser particles from a stream of flue gas being treated by a spray dryer absorption process, a spray dryer absorption apparatus for treating a stream of flue gas containing entrained particles, and a gas disperser unit for reducing the amount of coarser particles from a stream of flue gas prior to treatment by a spray dryer absorption process.

BACKGROUND FOR THE INVENTION

Combustion plants emit large amount of flue gas containing fly ash and harmful gasses, such as $SO_2$. Therefore, to avoid undesired impact on the environment, combustion plants usually have installed flue gas desulfurization systems to reduce $SO_2$ emission and units reducing the particulate emission.

A particular attractive way of removing particles as well as acidic components from a flue gas is provided by a spray dryer absorber (SDA). In an SDA acidic gasses are absorbed in an absorbent sprayed into the flue gas. Typically, the flue gas is introduced into a spray dryer absorption chamber and contacted with a fine spray of absorbent slurry, such as an aqueous suspension of burned lime. A significant part of the acidic components in the flue gas are rapidly absorbed into the alkaline droplets and water is evaporated simultaneously. The gas distribution, slurry flow rate and droplet size are controlled such that the droplets are dried to a fine powder.

U.S. Pat. No. 4,279,873 (Niro) discloses an SDA of the type disclosed above, which further have been improved by partly recycling of the fine powder produced in the chamber of the SDA. The recycling results in the use of less absorbent because unreacted alkaline absorbent, such as $Ca(OH)_2$, remains in the fine powder.

Poor quality coal and other fossil combustibles generate significant amounts of ash as a by-product of combustion. This ash typically is collected at the bottom of the furnace but significant quantities as fly ash can become entrained in the flue gas stream exiting the furnace.

The fly ash is highly abrasive and can abrade ducting, guide vanes, dampers and other components of the SDA. The ash particles collide with the apparatus components and causes extensive surface abrasion. In advanced stages of abrasion the components get perforated and may fail once they lose their structural integrity. Such abrasion shortens the service-life of the SDA components. When damaged components have to be replaced, the plant, e.g. a power station, has to be shut down. The resulting costs are not only the costs of replacing the components but also the cost of stoppage of power production.

To reduce the wear of sensitive parts of the gas disperser a pre-collector to filter out fly ash may be required. U.S. Pat. No. 5,738,711 suggests using a hopper with a deflector and a screening arrangement to separate fly ash from the flue gas exiting a furnace. Others have suggested the use of electrostatic precipitators, cyclones or bag filters to reduce the content of fly ash in the flue gas.

U.S. Pat. No. 4,530,822 shows some embodiments of an SDA and the use of different atomizing means such as a rotary atomizer wheel or nozzles.

The present invention is based on the assumption that small amounts of fly ash, such as below 20 $g/Nm^3$, are acceptable. However, beyond that the fly ash creates too much wear on the gas disperser which feeds the flue gas into the SDA. Hitherto, the excessive amounts of fly ash have been separated out in external pre-collectors, which, however, complicate the entire process and contribute to the total costs of the plant. It is the aim of the present invention to substantially reduce the cost of the entire SDA plant for treating flue gas having a high content of entrained particles. Lower cost of the SDA system may prompt areas rich in coal of a poor quality to control the air pollution by using a SDA system for treating the flue gas. A further aim is to reduce the "foot print" of the plant, i.e. the ground area needed for erecting the plant.

SUMMARY OF THE INVENTION

The present invention relates to a method for reducing the amount of coarser particles from a stream of flue gas prior to treatment by a spray dryer absorption process, comprising the steps of:

directing a stream of flue gas containing entrained particles of varying sizes through a curve, thereby subjecting the particles to a centrifugal effect, collecting the particles predominately of the coarser size at a particles collecting means provided in the outer circumference of the curve, dispersing the flue gas reduced in particles of coarse particle sizes into the chamber of a spray dryer absorption apparatus, wherein the particles content of the original flue gas stream is above 20 $g/Nm^3$.

It has been realized by the present inventors that not only the amount of particles is important for the abrasion, also the size of the particles is of significance for the abrading properties of the flue gas. Thus, a purpose of the invention is to reduce the amount of coarser particles in the flue gas before the flue gas comes into contact with sensible parts of the SDA. The particles of the present invention comprise dust particles or fly ash formed directly by the combustion of fossil fuel as well as particles present in the flue gas from other origins, such as solid carrier materials or additives from fluid bed combustion.

The curve through which the stream of flue gas is directed is curved at least 90 degrees. In a preferred embodiment, the curve is at least 180 degrees, such as at least 270 degrees. The curve may be designed such that the conduit is narrowed along the direction of the flue gas. In a preferred embodiment the curve is a scroll in which the cross-sectional area of the duct diminishes constantly along the path of the flue gas stream. At the inner circumference of the scroll guide vanes are positioned to disperse the flue gas in a desired flow pattern around an atomizer. The narrowing of the scroll is suitably designed to obtain a substantially constant flow rate of the flue gas inside the curve.

Usually, the inner diameter of the scroll is at least 2 meter but may be 15 m or more. The outer radius at the inlet may be 2 m or more but is usually not above 13 m. The flue gas introduced into the scroll may have a velocity dependent on the design of the scroll. A typical velocity may be in the range of 15 to 18 m/s.

The scroll is usually supplied with flue gas by a single inlet. However, it may in certain embodiments be an advantage to introduce flue gas into the scroll at several positions. Also, one SDA may have more gas dispersers in the top part, e.g. three.

The particles having been subjected to a centrifugal force are collected at the outer circumference of the curve in one or more particle collection means, which herein also may be referred to as ash traps or dust traps. When a single particles collecting means is used the length of the curve is suitably 180 degrees or more. The particles collecting means may be positioned after a curve of 45 to 135 degrees to collect the largest particles. If, however, the particles collecting means is positioned between 135 and 225 degrees a higher amount of the largest particles may be catched. In addition a substantial amount of the mid-sized particles is collected too. If a single particles collecting means is used, it is preferably positioned between 225 and 315 degrees to catch a high amount of the coarser particles abrading the components of the device.

In an aspect of the invention, two particles collecting means are provided in the curve. The first particles collecting means may be provided to collect the largest particles after a curve of 45 to 135 degrees and the second particles collecting means may be provided after 225 to 315 degrees to collect a part of the remaining particles. In the event a third particles collecting means is provided, it is usually situated between the first and the second, i.e. between 135 and 225 degrees. The use of two or more particles collecting means has the advantage that the wear of the scroll itself is reduced and the wear on the particles collecting means itself is distributed.

The optimum number of installed particle collection means in a gas disperser is dependent on a number of parameters, of which the most important is the particle loading in the inlet flue gas. Other parameters, which may influence the selection of number of particle collection means are: flue gas amount (size of gas disperser), gas disperser type, particle size distribution and abrasiveness of particles.

Experiments have shown that 2 particle collection devices often are the optimum number. The first Particle Collection Device is often located on the outer perimeter of the scroll at around 90° from the inlet.

The first particle collection means has the primary purpose of collecting the very coarse particles, mainly in order to avoid abrasion on the scroll itself.

The second particle collection means is often located on the outer perimeter of the scroll at around 270° from the inlet. The second particle collection device has the main purpose of collecting the remaining very coarse particles and the medium size particles, mainly to avoid abrasion on the various sets of guide vanes leading the flue gas from the scroll into the absorber vessel.

Easier jobs may be handled with only 1 particle collection means, whereas very difficult jobs may require as many as 4 or 6 particle collection means.

The particles entering the flue gas disperser are of varying sizes. Often, the particle sizes entering the curve is distributed such that 10 vol % of the particles are of a size above 100 μm. The invention is suitable for treating flue gasses with a substantial amount of abrasive particles having a size of above 100 μm.

The flue gas may originate from any combustion process, including combustion of fossil fuel, incineration of waste, or from other processes generating industrial off-gases. The method of the invention is especially suitable to treat flue gasses from combustion of coals that result in a high amount of fly ash.

The method of the invention may reduce the amount of the coarser particles from a stream of flue gas to a significantly lower level. In a preferred aspect 50% or more of the particles having a size of 150 μm and above is collected at the particles collecting means. In a more preferred aspect the amount of collected particles is 60% or more of the particles having a size of 150 μm and above.

In a further aspect of the invention it relates to a spray dryer absorption apparatus for treating a stream of flue gas containing entrained coarse particles, comprising a gas disperser for entering the flue gas into a spray dryer absorber chamber containing an atomizer for spraying an absorbent slurry, and an outlet for the treated flue gas, wherein the gas disperser comprises a curved conduit through which the stream of flue gas is guided, thereby affecting the entrained particles with a centrifugal effect, a particles collecting means positioned at the outer perimeter of the curved conduit for collecting the particles, and particles positioning means for assisting in the conveying the particles to the particles collecting means.

The SDA apparatus of the present invention has the advantage that a pre-collector may be omitted even when the content of particles in the flue gas stream is high, i.e. above 20 $g/Nm^3$. Depending on the particle origin such content may be above 25 g/Nm3, above 30 g/Nm3, above 40 g/Nm3 or above 50 g/Nm3. Despite the absence of a pre-collector for particles, the risk of abrasion is substantially reduced due to the reduced amount of coarser particles.

The particles collecting means positioned at the outer perimeter of the curve may have various designs. In a first embodiment, the particles collecting means comprises a slot in the outer perimeter and a duct for conveying the collected particles. The slot may extend in the entire height of the curved conduit or only a part thereof. Since the particles of the larger size are supposed to be conveyed at the lower part of the curved conduit and it is desired not to withdraw more flue gas than necessary, it is preferred to let the slot extend only partly from the bottom of the conduit towards the ceiling. Thus, it is preferred to let the slot extend from the bottom of the conduit and half the way or less to the ceiling. In a certain aspect of the invention the slot extends 30% or less from the bottom towards the ceiling. Usually, the slot extends at least 5% from the bottom towards the ceiling. The slot is usually connected to a duct allowing the particles exiting through the slot tangentially to move into the duct.

The exact sizing of the slot type particle collection means is defined by the width (W) of the slot and by a height/width (H/W)-ratio of the slot. The H/W ratio is optimally selected depending on various parameters, of which the most important are the particle size distribution and the flue gas velocity. A typical H/W-ratio is about 2, but some designs may involve H/W-ratio as low as 1 or H/W ratio of 3 or even higher. An option is to extend the slot all the way to the roof of gas disperser scroll and thereby possibly eliminate the need for wall guide tracks. The H/W-ratio could in this scenario be higher than 10.

The width may be dependent of the gas disperser size. The width, the H/W-ratio and the number of particle collection means define the total flue gas outlet area via the particle collection means. This area will be selected to give the desired particle collection without bypassing an excessive amount of flue gas around the gas disperser inner part. The amount of flue gas passing through the particle collection devices should normally be in the range 0.5-10.0% of the total amount of flue gas.

Some typical dimensions for a Particle Collection Device at a typical gas disperser treating between 100.000 to 500.000 kg flue gas per hour will be about H=200 mm and about W=100 mm. Smaller dimension are selected at smaller gas dispersers, larger dimensions are selected for larger gas dispersers. The parameters influencing the selection of the dimensions for the particle collection devices may beside the gas disperser size be: number of particle collection devices, particle loading and particle size distribution.

In another design of the particles collecting means, it comprises a deflector in the outer perimeter and a duct for conveying the collected particles. The deflector usually extends from the inner face of the outer perimeter towards the centre of the curve and has the purpose of disturbing the path of the particles entrained by the stream of flue gas. The deflector may extend entirely from the bottom of the conduit to the ceiling or only a fraction thereof. In a preferred aspect it is desired to have the deflector only to extend from the bottom and upwards 70% or less towards the ceiling of the curved conduit.

When the particles collides with the deflector it is presently believed that a substantial amount of the particles lose energy and drops to the bottom of the conduit in front of the deflector. The bottom of the curved conduit is provided with an opening allowing for the extraction of the particles. The opening is connected to a duct for transportation of the particles.

The embodiment using a slot may be preferred over the deflector embodiment because some particles are suspected to bounce off the deflector plate and re-enter the scroll flow. In addition some particles may follow the air flow around the particles collecting means construction and thus avoid capture by the trap. The slot embodiment avoids the bouncing and channels the particles out of the gas disperser before their direction is changed. However, the reflector embodiment may be less costly.

The duct from the particles collecting means may convey the collected particles to the top or the bottom of the SDA chamber. Alternatively, the fly ash is led out of the SDA apparatus e.g. to a cyclone. Usually, it is not desired to convey the collected particles out of the SDA chamber.

Since the authorities may demand for continued running of the SDA all year to satisfy the emission rules according to which even short pauses in the flue gas cleaning cannot be tolerated, the slot type particles collecting means are suitably accessible for service from the outside of the spray dryer absorption apparatus.

The flue gas enters the gas disperser through an inlet having a fairly large cross-section. It is assumed that the particles are affected differently by the centrifugal force across the cross-section. Therefore, in some embodiments of the invention, it may be expedient to provide particles positioning means in the gas disperser main inlet or upstream hereof to guide the particles in a certain direction.

A particles positioning means in the inlet area may for instance be a diverter plate positioned at the gas disperser main inlet for directing the inlet flue gas in the direction of the outer perimeter. When the curved conduit is part of a scroll, the diverter plate is suitably placed so as to allow a relatively small amount of the flue gas that has circulated once to re-enter the scroll together with the fresh stream of flue gas. By appropriately adjustment of the diverter plate it has been possible to reduce or eliminate excess wear observed in the vicinity of the re-entering area.

According to another embodiment, the particles positioning means is an additional curved conduit positioned immediately upstream on the inlet of the scroll. The additional curved conduit may be regarded as an extension of the scroll or a for-rotation of the flue gas. The extended scroll consist of a piece of ductwork located upstream the inlet flange to the gas disperser scroll. This piece of ductwork turns the flue gas in the same direction as the scroll. The turning angle is normally between 30° and 120°. The preferred turning angle of the extended scroll is around 90°. When an extended scroll is used, the particles collecting means may be positioned differently to collect a large part of the most heavy particles shortly after or at the entrance of the scroll.

The particles position means may also be present in the interior of the curved conduit, such as the scroll. In a suitable embodiment, the particles positioning means is a floor guide track, in which a rod, preferably abrasive resistant, is attached to the bottom of the curved conduit to assist the movement of the particles towards the outer perimeter of the curved conduit. The rod may be steel profiles or similar means extending from the floor of the curved conduit. The rod may have any suitable cross-sectional shape such as a rectangle or an L-form. A square form of the rod has shown to be useful. The main purpose of the rod is to guide the particles that no longer are entrained in the flue gas but moves at a lower velocity at the bottom part of the curved conduit. The floor guide track ends short before it reaches the outer perimeter of the curved conduit. Usually a short distance between the rod and the wall in the order of 5-20 cm is provided to avoid wear due to bombardment of the outer wall with particles.

The rod is preferably at least partly hollow. If the material of the rod is abraded to form an opening, the particles will move into this opening and thereby prevent that the other side of the rod material is abraded. In this way the particles function as an abrasion layer.

The rod may be straight or curved. In a preferred aspect the rod is convexly curved in the flow direction of the stream of flue gas. It is generally suitable to have the rod to extend in almost the entire length from the inner gas disperser to the outer wall of the curved conduit. The spray dryer absorption apparatus may be provided with a single, 2, 3, 4, or more rods to obtain the desired effect.

In a preferred embodiment the particles positioning means is of an at least partly annular shape surrounding a part or all of the gas disperser guide vanes. The annular elevation prevents some of the particles from entering the sensible vanes of the gas disperser. The straight or curved rod may be positioned with one end close to the annular extension to transport the particles away from the vicinity of the gas disperser toward the outer perimeter of the curved conduit.

According to a further embodiment the particles positioning means is a plurality of rods, wall guide tracks, attached to the outer perimeter of the curved conduit, said rods being essentially perpendicular to the stream of flue gas. The purpose of the essentially vertical abrasive resistant rods is to guide the particles to the bottom of the curved conduit.

The various measures for the particles positioning means may be combined to obtain the desired effect. Experiments have shown that a combination of a diverter plate and floor guide tracks has resulted in a markedly reduced wearing of the gas disperser.

The invention also relates to a gas disperser unit for reducing the amount of coarser particles from a stream of flue gas prior to treatment by a spray dryer absorption process. The gas disperser unit comprises a curved conduit through which the stream of flue gas is guided, thereby affecting the entrained particles with a centrifugal effect, a particles collecting means positioned at the outer perimeter of the curved conduit for collecting the particles, and particles positioning means for assisting in the conveying the particles to the particles collecting means.

DETAILED DISCLOSURE OF THE INVENTION

The avoidance of harmful emissions from power plants and waste incinerators has high priority in the political debate. The present invention offers an option for lowering the costs for plants producing high a mounts of particles from combustion of fossil fuels, including coal, but may also be used relating to incineration of waste, or from other processes generating industrial off-gases Coal exists in various forms and any of these can be used for providing the flue gas used in the method of the present invention. The term coal, as used herein, covers peat, lignite (also referred to as brown coal), sub-bituminous coal, bituminous coal, anthracite, and graphite.

Figure 1:
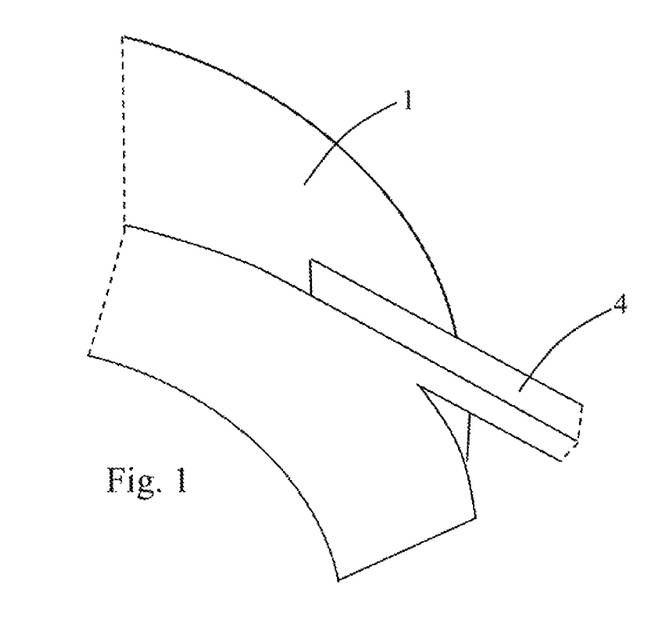
FIG. 1 discloses a detail of a scroll viewed from outside below.
Figure 2:
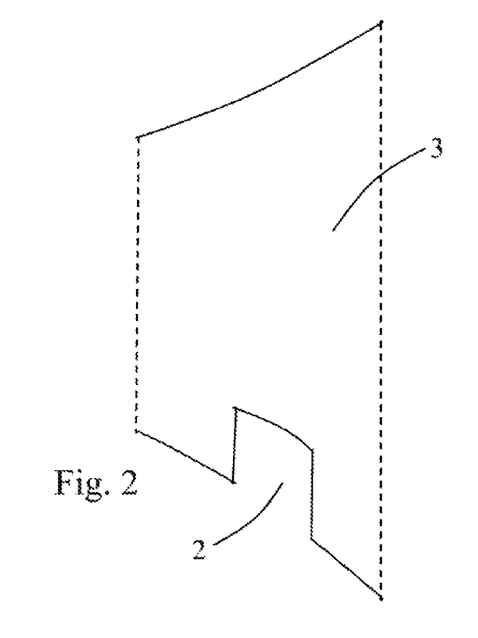
FIG. 2 shows in a perspective view a slot in a part of the inner face of the outer perimeter of a scroll.

FIG. 1 shows a part of a curved conduit 1 from the outside provided with a particles collecting means of the slot type. The slot 2 is shown in FIG. 2 in the lower part of the vertical wall 3 defining the outer perimeter of the conduit. The slot is connected to a duct 4 for transportation of the flue gas with entrained particles. The duct has a rectangular cross section and the inner opening of the duct corresponds to the dimension of the slot. The duct is provided tangential to the curved conduit to allow the particles to exit the gas disperser unit without being deflected. The duct 4 may be provided with a replaceable wear resistant insert.

Figure 3:
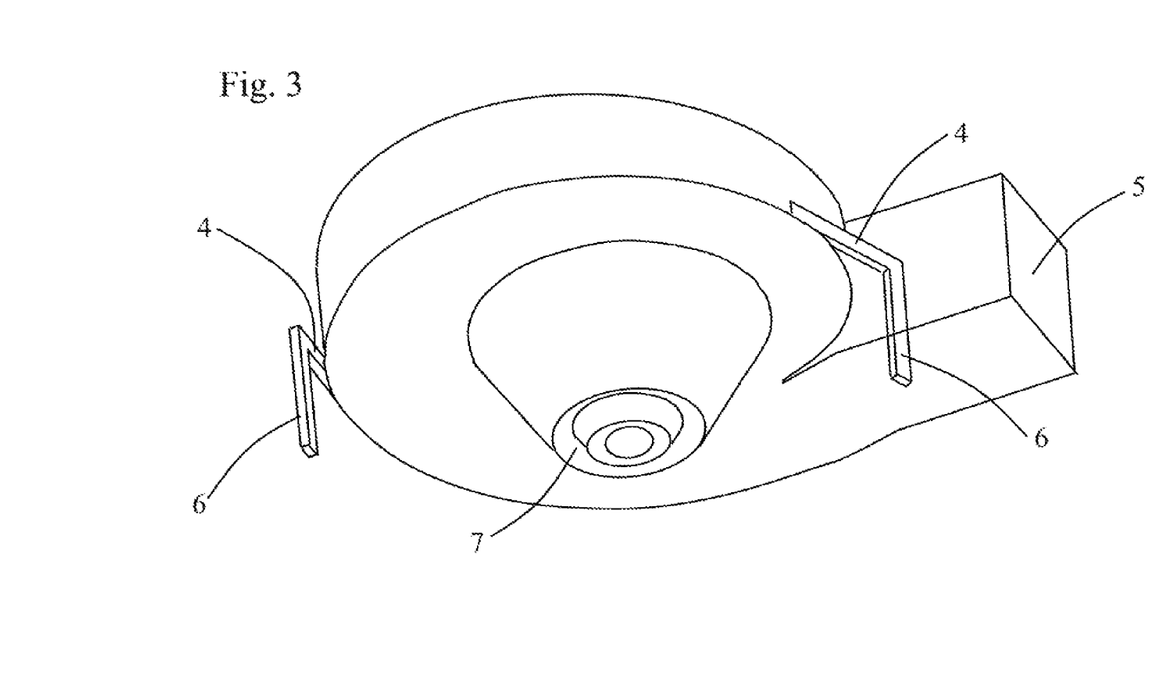
FIG. 3 depicts the gas disperser unit provided with two slot particles collecting means viewed from below.

FIG. 3 shows the particles collecting means of the slot type provide on a flue gas disperser for an SDA. The gas disperser is viewed in perspective from below and is suitable for top mounting in a SDA system. The flue gas preferably enters directly into the gas disperser unit of the invention without being pre-treated to remove a part of the particles. The entrance 5 of the flue gas occurs through a conduit having a rectangular cross-section. The capturing effect may be further improved by using particle positioning means in the inlet 5 or upstream hereof. The curved form of the conduit subjects the entrained particles to a centrifugal effect. Since the centrifugal force depends on the size of the particles it is assumed the particles with a large size will have a tendency to be deflected to a minor degree, whereas minor particles to a greater extend will be entrained by the streaming flue gas.

Two particles collecting means have been provided in the perimeter of the conduit. The first particles collecting means is provided after the conduit has curved around 90 degrees and the second particles collecting means is provided after the conduit has curved about 270 degrees. The horizontally ducts 4 meet vertically ducts 6, which convey the flue gas with entrained particles to the SDA chamber. These ducts may have replaceable wear resistant lining. Such replacement may be performed from the outside and during operation. The ash is self-transporting due to the flue gas flow in the particles collecting device. The main part of the flue gas depleted of coarse particles is led through guide vanes and enters the SDA chamber at outlet 7. In the centre, an atomizer, a rotary atomizer wheel or nozzles, (not shown) is provided for spraying droplets of the absorbent into the dispersed flue gas. The form of the curved conduit resembles a snail shell and is generally referred to herein as a scroll.

Figure 4:
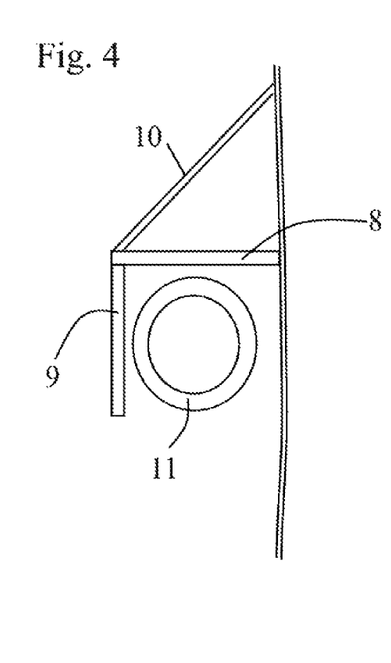
FIG. 4 shows schematically a deflector viewed from above.

FIG. 4 shows a top view of a deflector mounted in the inner face of the curved conduit. The deflector comprises an oblong vertical plate 8 extending from the bottom of the curved conduit towards the ceiling. The oblong vertical plate is positioned in the conduit essentially perpendicular to the direction of the flue gas flow. The particles collecting means further comprises a shielding plate 9 to prevent particles that has collided with the vertical plate 8 to re-enter the flue gas stream. The shielding plate is mounted perpendicular to the plate 8 and in parallel with the flow direction. A plate 10 may be placed to prevent unwanted turbulence. A circular opening 11 allow the particles captured by the trap to exit the scroll. Usually, the inner face of the particles collecting means is covered with a wear resistant surface, e.g. a coating, a special metal or ceramic, a bushing, ceramic tiles or the like. The presence of the tiles makes it easy to service the particles collecting means since the used tiles may simply be replaced with new tiles. The opening in the floor of the curved conduit is connected to duct 12 for conveying the particles to the SDA chamber.

Figure 5:
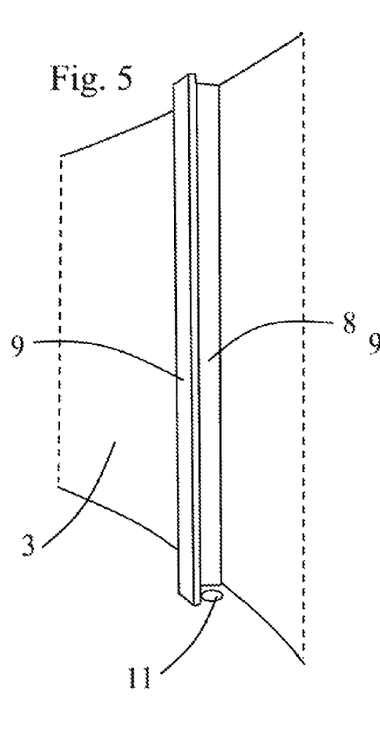
FIG. 5 shows a deflector mounted on the inner face of the outer perimeter of a scroll.
Figure 6:
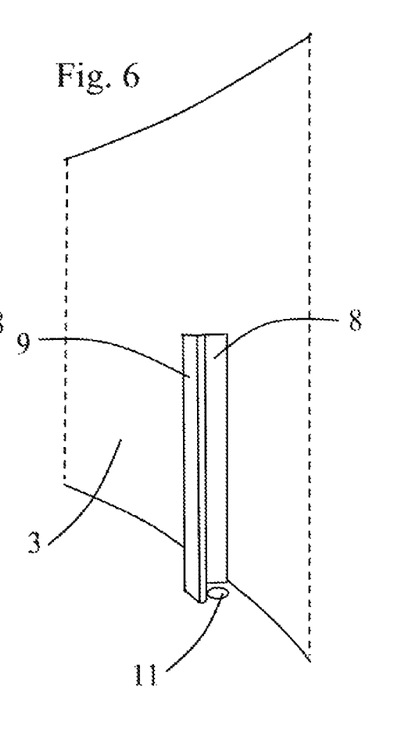
FIG. 6 shows a deflector extending half way up to the ceiling.

The deflector type particles collecting means is shown in two embodiments in FIG. 5 and FIG. 6 in a perspective view. In FIG. 5, the trap formed by the vertical plate 8 and the shielding plate 9 extends from the bottom to the ceiling of the curved conduit. The embodiment shown in FIG. 6 extends only half the way towards the ceiling.

Figure 7:
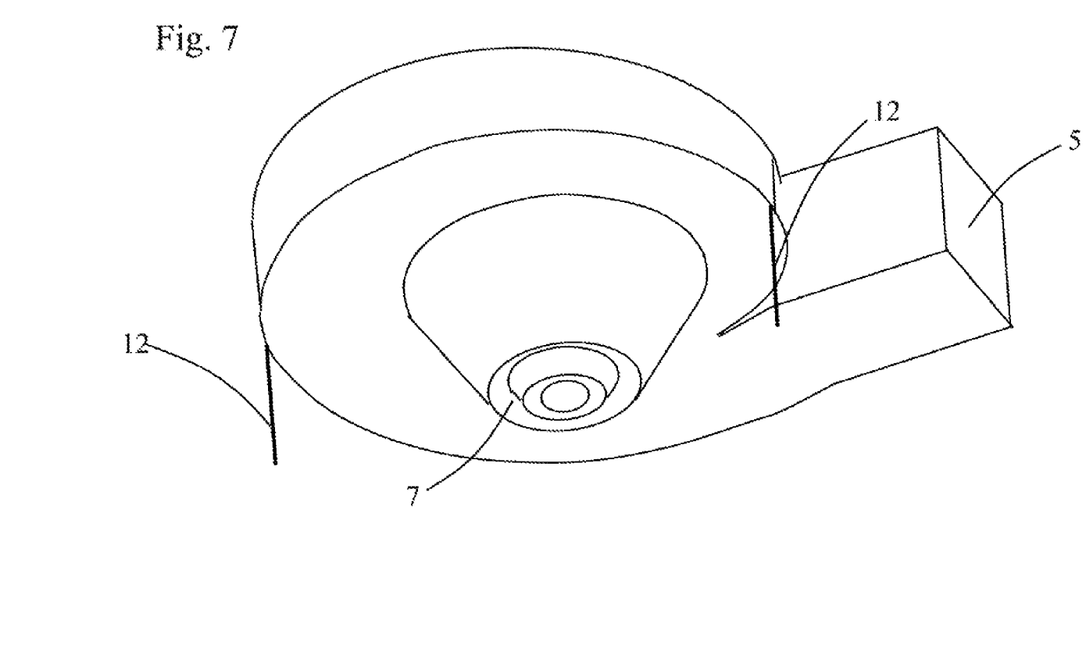
FIG. 7 shows the gas disperser unit provided with two deflector particles collecting means viewed from outside below.

FIG. 7 shows the gas disperser in a view from below. Two particles collecting means have been provide in the perimeter of the conduit. The first particles collecting means is provided after the conduit has curved around 90 degrees and the second particles collecting means is provided after the conduit has curved about 270 degrees. The vertical ducts 12 convey the flue gas with entrained particles to the SDA chamber. The main part of the flue gas depleted in coarser sized particles is forced through guide vanes and enters the SDA chamber at outlet 7.

It should be understood that any type of trap whether using a slot or a deflector or another design may be combined with ducts as shown in FIG. 3 and FIG. 7, or other ducting designs.

Figure 8:
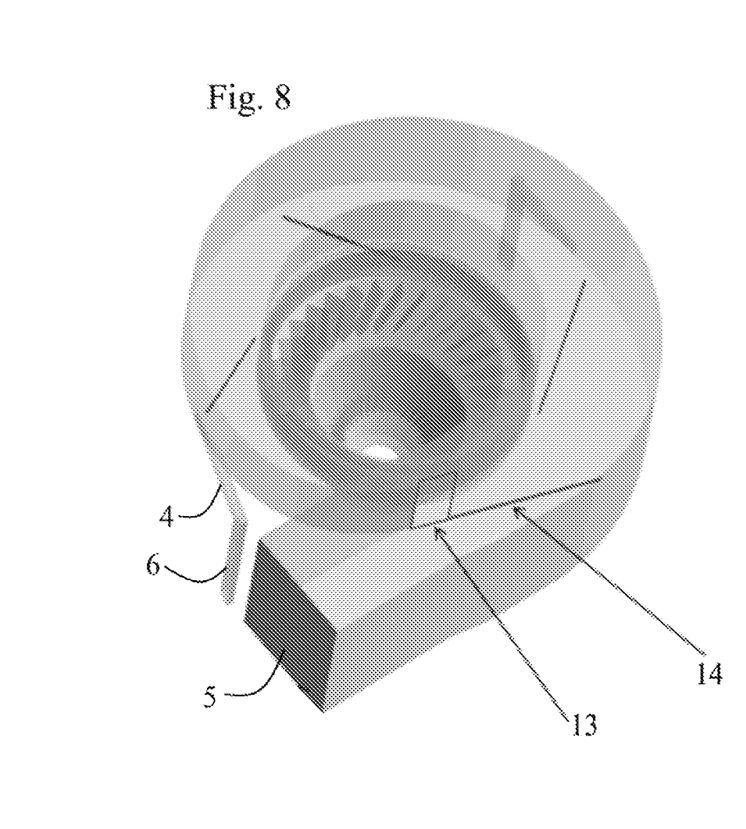
FIG. 8 shows a scroll with a diverter plate in perspective from above.

FIG. 8 shows a partly transparent perspective view of the scroll. In the inlet area a diverter plate 13 is positioned for directing the inlet flue gas in the direction of the outer perimeter. The diverter plate is placed so as to shield the guide vanes from the particles in the flue gas. Typically, the diverter plate is a square having a length of the edges of 0.5 to 1.5 m depending on the size of the equipment. By appropriately adjustment of the diverter plate excess wear observed in the vicinity of the re-entering area is avoided.

The diverter plate may be regarded as an extension of the scroll wall. The presence of the diverter plate reduces the tendency of particle impingement on the guide vanes where the two streams of gases are mixed. The particle impingement otherwise may result in excessive abrasion in the area in the vicinity of the mixing of the gas streams.

In FIG. 8 a straight rod 14 as a floor guide track is welded to the bottom of the scroll. The straight rod extents in the lower part of the scroll from the lower part of the diverter plate to or close to the vertical outer wall of the scroll. The straight rod assists the movement of the particles towards the outer perimeter of the scroll. The straight rod is prepared of a hollow steel profile. The steel profile has e.g. a 0.1×0.1 m square form.

The bottom of the scroll is provided with 3 further floor guide tracks. These tracks extend from close to the guide vanes of the gas disperser to close to the inner face of the outer wall of the scroll. The floor guide tracks may be curved or straight with rather similar results but calculations have shown that the curved guide tracks are superior.

Figure 9:
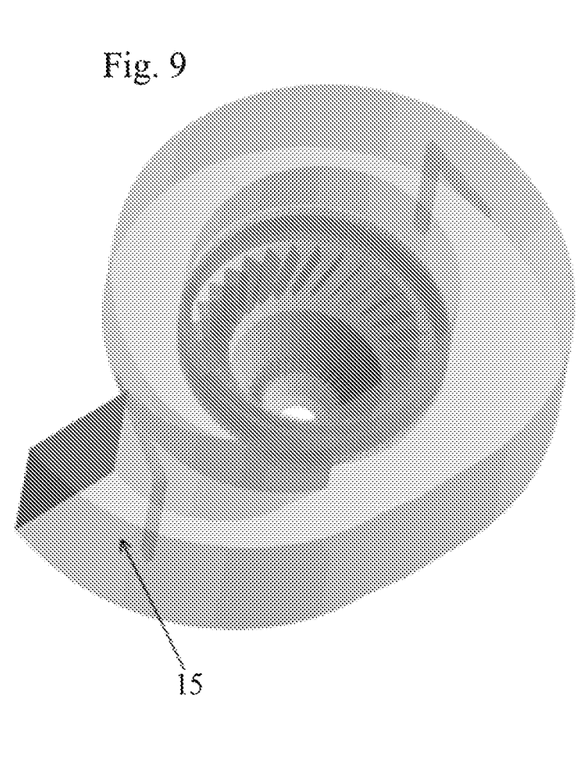
FIG. 9 shows a scroll with an extension in perspective from above.

FIG. 9 shows a scroll with an additional curved conduct 15 arranged immediately upstream of the inlet flange. The extended scroll has a further 90° turn providing for a prolonged centrifugal effect of the particles entrained in the flue gas stream.

Figure 10:
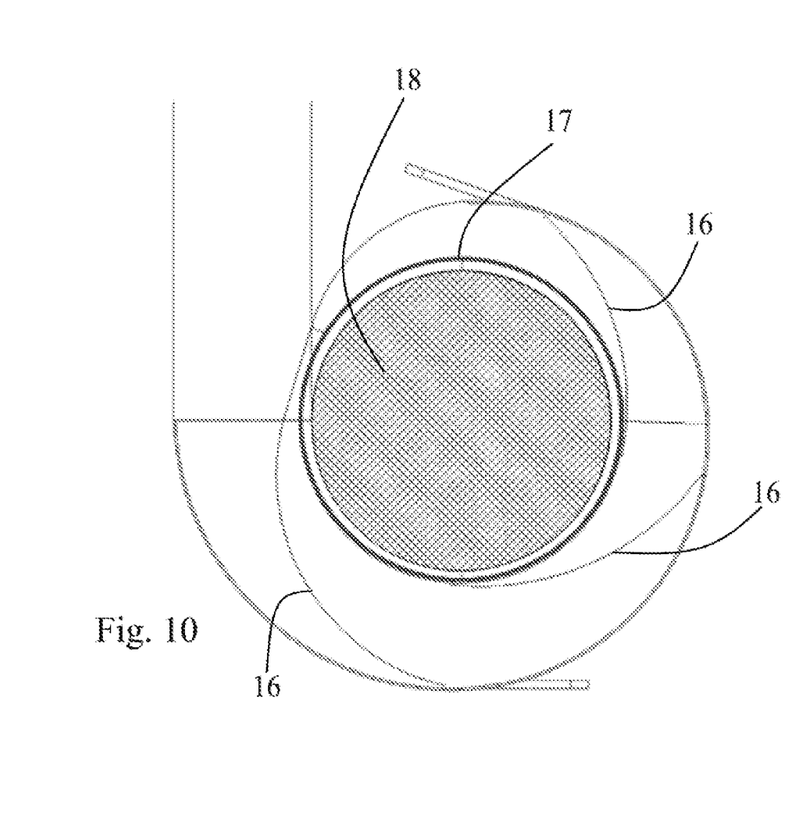
FIG. 10 shows a scroll having curved floor guide tracks.

FIG. 10 shows a view from above of a gas disperser scroll. The floor of the gas disperser scroll is provided with evenly distributed curved guide tracks 16. The guide tracks are prepared of a hollow profile steel rod that has been bent. The curved guide tracks are convex in the flow direction of the flue gas to obtain an efficient transportation of the particles along the rod and an efficient delivery at the inner face of the outer scroll wall.

The annular guide vanes 18 of the disperser positioned centrally in the scroll are surrounded by an annular elevation 17. The annular elevation prevents some or all of the particles from entering the sensible vanes of the gas disperser. The curved rods 16 are positioned with one end close to or abutting the annular elevation to guide particles at the edge of the elevation towards the inner face of the outer wall of the scroll. The annular elevation has a height similar to the height of the curved rods.

EXAMPLES

Example 1

The particle size distribution of the fly ash received from a power plant or a waste incinerator may differ considerably from case to case. An example of such distribution from a power plant is given below.

| Less than (μm) | Cumulated frequency (%) |
| --- | --- |
| 3 | 8 |
| 7 | 18 |
| 13 | 33 |
| 20 | 46 |
| 31 | 59 |
| 40 | 64 |
| 52 | 67 |
| 150 | 91 |
| 300 | 100 |

The coarse fraction of the particles is generally more abrasive than the fine fraction, so the bigger the mean particle size or the coarse fraction is, the bigger the wear problem is.

In a typical 300 MW power plant the flue gas amount entering the SDA with a typical diameter of 17 m may be about $1 \cdot 10^6$ Nm3/h. Assuming the flue gas contains 30 g/Nm$^3$ fly ash, the total amount of fly ash is 30 ton/h.

Computer simulations have been performed based on three embodiments: slot type particles collecting means (FIG. 1, FIG. 2, and FIG. 3), deflection type particles collecting means (FIG. 4, FIG. 5, and FIG. 7) with full deflector height, deflection type particles collecting means (FIG. 4, FIG. 6, and FIG. 7) with half deflector height. The calculations were performed on particles having the diameters 10, 50, 100, 150, and 200 μm, approximate spherical form, and a density of 2.6 g/cm$^3$. The flue gas inlet flow velocity was set to 16.6 m/s and the flue gas was estimated to a density of 0.882 kg/m3 and a viscosity of $2.314 \cdot 10^{-5}$ Pa s.

The result of computer simulations is shown in tables 1 to 4.

TABLE 1

Deflector type particles collecting means - full height

| d μm | 1$^{st}$ ash trap | 2$^{nd}$ ash trap | Total recovered |
| --- | --- | --- | --- |
|  | % recovered particles | | |
| 10 | 0.2 | 0.2 | 0.5 |
| 50 | 3 | 3 | 6 |
| 100 | 13 | 0.2 | 13 |
| 150 | 28 | 0 | 28 |
| 200 | 40 | 23 | 63 |

TABLE 2

Deflector type particles collecting means - half height

| d μm | 1$^{st}$ ash trap | 2$^{nd}$ ash trap | Total recovered |
| --- | --- | --- | --- |
|  | % recovered particles | | |
| 10 | 0.2 | 0.3 | 0.5 |
| 50 | 2 | 5 | 8 |
| 100 | 10 | 27 | 37 |
| 150 | 21 | 37 | 58 |
| 200 | 3 | 32 | 65 |

TABLE 3

The slot type particles collecting means

| d μm | 1$^{st}$ ash trap | 2$^{nd}$ ash trap | Total recovered |
| --- | --- | --- | --- |
|  | % recovered particles | | |
| 10 | 1 | 1 | 3 |
| 50 | 4 | 10 | 14 |
| 100 | 13 | 43 | 55 |
| 150 | 25 | 43 | 68 |
| 200 | 37 | 38 | 75 |

TABLE 4

Slot type particles collecting means using diverter plate and curved floor guide tracks.

| d μm | 1$^{st}$ ash trap | 2$^{nd}$ ash trap | Total recovered |
| --- | --- | --- | --- |
|  | % recovered particles | | |
| 10 | 1 | 1 | 3 |
| 50 | 4 | 11 | 15 |
| 100 | 17 | 48 | 65 |
| 150 | 32 | 62 | 94 |
| 200 | 43 | 56 | 99 |

The computer simulations indicate that each of the three embodiments is able to reduce the amount of coarser particles in the flue gas. However, the amount of particles removed by the particles collecting means is best for the slot type particles collecting means. It appears that the superiority applies for all particle sizes. It is believed that the reason is that the slot type particles collecting means channels the particles out of the gas disperser before they are directed downwards. The deflector type particles collecting means appears to be less favourable because colliding particles tend to bounce away into the gas stream instead of being directed to the outlet. The slot type particles collecting means may be drastically improved for particles above 100 μm by using a diverter plate and curved floor guide tracks in combination By combining the slot type particles collecting means with positioning means in the gas disperser, the recovery efficiency increases significantly. Using only floor guide tracks or a diverter plate as positioning means will increase the recovery efficiency, but a higher efficiency is obtained with a combination of means. The extended scroll may be used with or without further positioning means.

In addition to the floor guide tracks, wall guide tracks may be installed for guide of particles towards the floor. The wall guide tracks are most beneficial in smaller gas dispersers, but may be installed in all dispersers irrespective of the size.

The invention claimed is:

1. A spray dryer absorption apparatus for treating a stream of flue gas containing entrained coarse particles, comprising a gas disperser for entering the flue gas into a spray dryer absorber chamber containing an atomizer for spraying an absorbent slurry, and an outlet for the treated flue gas, wherein the gas disperser comprises a curved conduit through which the stream of flue gas is guided, thereby affecting the entrained particles with a centrifugal effect, a particles collecting means positioned at the outer perimeter of the curved conduit for collecting the particles, and one or more particles positioning means for assisting in conveying the particles to the particles collecting means.

2. The spray dryer absorption apparatus according to claim 1, wherein the curved conduit is curved at least 90 degrees.

3. The spray dryer absorption apparatus according to claim 1, wherein the curved conduit is part of a scroll having a cross-sectional area diminishing along the path of the flue gas stream.

4. The spray dryer absorption apparatus according to claim 1, wherein two or more particles collecting means are positioned along the perimeter of the curved conduit.

5. The spray dryer absorption apparatus according to claim 1, wherein the particles collecting means comprises a slot in the outer perimeter and a duct for conveying the collected particles.

6. The spray dryer absorption apparatus according to claim 1, wherein the particles collecting means comprises a deflector in the outer perimeter and a duct for conveying the collected particles.

7. The spray dryer absorption apparatus according to claim 1, wherein the collected particles are conveyed to the top of the spray dryer absorber chamber.

8. The spray dryer absorption apparatus according to claim 1, wherein the collected particles are conveyed to the bottom of the spray dryer absorption chamber.

9. The spray dryer absorption apparatus according to claim 1, wherein the collected particles are conveyed out of the spray dryer absorption apparatus.

10. The spray dryer absorption apparatus according to claim 1, wherein particles positioning means is provided in the gas disperser main inlet or upstream hereof.

11. The spray dryer absorption apparatus according to claim 1, wherein the particles positioning means is a diverter plate positioned at the gas disperser main inlet for directing the inlet flue gas in the direction of the outer perimeter.

12. The spray dryer absorption apparatus according to claim 1, wherein the particles collecting means are accessible for service from the outside of the spray dryer absorption apparatus.

13. The spray dryer absorption apparatus according to claim 1, wherein the particles positioning means is an additional curved conduit positioned immediately upstream on the inlet of the scroll.

14. The spray dryer absorption apparatus according to claim 1, wherein the particles positioning means is a floor guide track, in which a rod is attached to the bottom of the curved conduit to assist the movement of the particles towards the outer perimeter of the curved conduit.

15. The spray dryer absorption apparatus according to claim 1, wherein the rod is convexly curved in the flow direction of the stream of flue gas.

16. The spray dryer absorption apparatus according to claim 1, wherein the rod is at least partly hollow.

17. The spray dryer absorption apparatus according to claim 1, wherein the particles positioning means is of an annular shape surrounding the gas disperser.

18. The spray dryer absorption apparatus according to claim 1, wherein the particles positioning means is a wall guide track in which a rod is attached to the outer perimeter of the curved conduit, said rod being essentially perpendicular to the stream of flue gas.

19. The spray dryer absorption apparatus according to claim 1, wherein two or more particles positioning means are selected.

20. A gas disperser unit for reducing the amount of coarser particles from a stream of flue gas prior to treatment by a spray dryer absorption process, comprising a curved conduit through which the stream of flue gas is guided, thereby affecting the entrained particles with a centrifugal effect, a particles collecting means positioned at the outer perimeter of the curved conduit for collecting the particles, and particles positioning means for assisting in the conveying the particles to the particles collecting means.

21. The disperser according to claim 20, wherein the curved conduit is curved at least 90 degrees.

22. The gas disperser according to claim 20, wherein two or more particles collecting means are positioned along the perimeter of the curved conduit.

23. The gas disperser according to claim 20, wherein the particles collecting means comprises a slot in the outer perimeter and a duct for conveying the collected particles.

24. The gas disperser according to claim 20, wherein the particles collecting means comprises a deflector in the outer perimeter and a duct for conveying the collected particles.

25. The gas disperser according to claim 20, wherein the particle positioning means is provided in the gas disperser main inlet or upstream hereof.

26. The gas disperser according to claim 20, wherein the particles positioning means is selected among one or more of the group consisting of (a) a diverter plate positioned at the gas disperser main inlet, (b) an additional curved conduit positioned immediately upstream on the inlet, (c) one or more floor guide tracks, (d) an annular shaped rod surrounding the gas disperser, and (e) one or more wall guide tracks.

\* \* \* \* \*